US008601165B2

(12) United States Patent
Blum et al.

(10) Patent No.: US 8,601,165 B2
(45) Date of Patent: *Dec. 3, 2013

(54) METHOD FOR SYNCHRONIZATION IN NETWORKS

(75) Inventors: Phillip Blum, Volketswil (CH); Georg Dickmann, Volketswil (CH)

(73) Assignee: SMSC Holdings S.A.R.L., Luxembourg (LU)

( * ) Notice: Subject to any disclaimer, the term of this patent is extended or adjusted under 35 U.S.C. 154(b) by 502 days.

This patent is subject to a terminal disclaimer.

(21) Appl. No.: 12/732,654

(22) Filed: Mar. 26, 2010

(65) Prior Publication Data

US 2011/0090925 A1    Apr. 21, 2011

Related U.S. Application Data

(63) Continuation of application No. 10/496,367, filed as application No. PCT/CH02/00580 on Oct. 25, 2002, now Pat. No. 7,716,375.

(30) Foreign Application Priority Data

Nov. 28, 2001   (CH) ........................................ 2188/01

(51) Int. Cl.
*G06F 15/16* (2006.01)
*G06F 15/177* (2006.01)

(52) U.S. Cl.
USPC ........... 709/248; 709/249; 709/220; 709/221; 709/222

(58) Field of Classification Search
USPC .......................................... 709/248, 208, 224
See application file for complete search history.

(56) References Cited

U.S. PATENT DOCUMENTS 5,001,730 A    3/1991   Franaszek et al.
5,261,118 A    11/1993  Vanderspool, II et al.
(Continued)

FOREIGN PATENT DOCUMENTS

DE    198 15 647 A1   10/1999
EP    0 389 780 A2    10/1990
(Continued)

OTHER PUBLICATIONS

XP-000615783. Time, Clocks, and the Ordering of Events in a Distributed System by Leslie Lamport; Communications of the ACM; Jul. 1978, vol. 21, No. 7, pp. 558-564.

(Continued)

*Primary Examiner* — Hieu Hoang
(74) *Attorney, Agent, or Firm* — King & Spalding L.L.P.

(57) ABSTRACT

The invention relates to a method for synchronization in networks, whereby the local time ($t_{loc}$) which is valid at the particular node, is updated at different nodes. For that purpose, timing messages are regularly transmitted by a freely selectable superior node (N1; N3; N6) and only by a superior node to an inferior node (N2, N3; N4-N6; N7), which receives the timing messages (M1-M8) and analyzes said messages for updating the local time ($t_{loc}$) thereof. A minimum propagation time ($d_{min}$) is determined for a timing message (M1-M8) between an inferior node (N1; N3; N6) and a superior node (N2, N3; N4-N6; N7). When the inferior node (N2, N3; N4-N6; N7) receives a timing message (M1-M8), said inferior node extracts the local time of the superior node (N1; N3), which is contained in said timing message (M1-M8) and adds the minimum propagation time ($d_{min}$) thereto, in order to generate a reference time ($t_{comp},1-t_{comp},8$). Said reference time ($t_{comp},1-t_{comp},8$) is then compared with the proper local time ($t_{loc}$). If the reference time is retarded in relation to the proper local time ($t_{loc}$), said proper local time ($t_{loc}$) is not updated. If said reference time is advanced in relation to the proper local time ($t_{loc}$).

11 Claims, 2 Drawing Sheets

(56) References Cited

U.S. PATENT DOCUMENTS

| | | | |
|---|---|---|---|
| 5,268,932 | A | 12/1993 | Okuzono |
| 5,530,846 | A | 6/1996 | Strong |
| 5,680,644 | A | 10/1997 | Sager |
| 5,689,688 | A | 11/1997 | Strong et al. |
| 5,717,861 | A | 2/1998 | Rabii |
| 5,793,976 | A | 8/1998 | Chen et al. |
| 5,884,072 | A | 3/1999 | Rasmussen |
| 5,923,220 | A | 7/1999 | Honma |
| 5,968,133 | A | 10/1999 | Latham et al. |
| 5,982,828 | A | 11/1999 | Fujimori et al. |
| 6,157,957 | A | 12/2000 | Berthaud |
| 6,178,531 | B1 | 1/2001 | Kolb |
| 6,182,163 | B1 | 1/2001 | Yamashita et al. |
| 6,247,082 | B1 | 6/2001 | Lo et al. |
| 6,361,440 | B1 | 3/2002 | Ogawa et al. |
| 6,449,291 | B1 | 9/2002 | Burns et al. |
| 6,535,926 | B1 | 3/2003 | Esker |
| 6,571,344 | B1 | 5/2003 | Sitnik |
| 6,760,764 | B1 | 7/2004 | Driediger et al. |
| 6,801,876 | B2 | 10/2004 | Barney et al. |
| 2002/0055999 | A1 | 5/2002 | Takeda |
| 2002/0163932 | A1 | 11/2002 | Fischer et al. |
| 2006/0104301 | A1* | 5/2006 | Beyer et al. ............ 370/445 |

FOREIGN PATENT DOCUMENTS

| | | |
|---|---|---|
| EP | 0 722 233 A2 | 7/1996 |
| WO | WO-00/48367 A2 | 8/2000 |

OTHER PUBLICATIONS

XP-000082683, Time Synchonization and Ranging for Multihop Mobile Radio Networks by Szu-Lin Sdu and Victor O.K. Li; 1986 IEEE. pp. 636-640.

XP000082683, IBM Technical Disclosure Bulletin/Clock Distribution Algorithm for Synchronization Network, vol. 32, No. 8A, Jan. 1990.

Distributed Computing (1989) 3: 146-158 by Flaviu Cristian, Probabilistic clock synchronization.

Fault-Tolerant Clock Synchronization for Distributed Systems Using Continuous Synchronization Messages, Alan Olson, et al., Real Time Computing Laboratory, The Univeristy of Michigan, 1995 IEEE.

IEEE Transactions on Parallel and Distributed Systems, K. Arvind, vol. 5, No. 5, May 1994, Probabilistic Clock Synchronization in Distributed Systems, pp. 474-487.

A Decentralized High Performance Time Service Architecture, Danny Dolev, et al., Nov. 1995—Institute of Computer Science, Hebrew University, Jerusalem, Israel.

Internet Time Synchronization: The network Time Protocol, David L. Mills, Electrical Engineering Department, University of Delaware, Oct. 1991.

\* cited by examiner

FIG. 3

METHOD FOR SYNCHRONIZATION IN NETWORKS

CROSS-REFERENCE TO RELATED APPLICATIONS

This application is a continuation of, and claims priority to, U.S. application Ser. No. 10/496,367, filed May 20, 2004, now U.S. Pat. No. 7,716,378 which is national stage of, and claims priority under 35 U.S.C. §371 to, International Application No. PCT/CH2002/00580, filed under the Patent Cooperation Treaty on Oct. 25, 2002, which claims priority to Swiss Patent Application No. CH 2188/01, filed Nov. 28, 2001, the disclosures of which are hereby incorporated by reference in their entirety.

BACKGROUND

The invention relates to a method for synchronization in networks, as claimed in the precharacterizing clause of the independent patent claim.

Many applications make use of computer resources (nodes) which are distributed in networks, for example in order to improve the performance and/or the error tolerance. In some of these applications it is necessary to have a common time base for all of the connected computer resources, for example in order to coordinate different events (for example, the generation of sound at different locations in order to achieve the stereo effect). This is dependent on (more or less accurate) synchronization of the local time at the various nodes.

The nodes in this case communicate via time messages, which are transported via a communications network. In this case, the communications network which is located between two specific nodes may possibly comprise two or more different types of networks, which are connected to one another.

Messages are typically transmitted in a communications network with the aid of messages which are transported via the network. In this case, depending on the type of the network and the traffic in the network—different time delays may occur during the transportation of such messages. This variability of the time delays during transportation of messages restricts the possible synchronization of the local time at the various nodes, however.

Various methods have already been proposed for synchronization of the local time at the various nodes. The "Network Time Protocol" NTP (RFC 1305, RFC 2030) has been implemented effectively as a standard method in message networks. This method allows by means of circulating messages from one node to various reference nodes and back again that reference node which results in the best connection (shortest delay times) to be selected for updating of the node's own local clock. However, this method generally requires two or more reference nodes, and with a smaller number of time messages less accurate synchronization is also achieved.

Furthermore, so-called probabilistic synchronization methods have already been proposed, for example in "Probabilistic Clock Synchronization", Distributed Computing, vol. 4, No. 3, pp. 146-158, 1989 (Cristian, F) and in "A Decentralized High Performance Time Service Architecture", (Dolev, D; Reischuk, R; Strong, R; Wimmers, E), 1995. The nodes select the best of a number of time messages from a reference clock, in order to set or adapt their local time in each case. This selection of the respectively best time message from the reference clock is possible because the individual nodes repeatedly transmit circulating messages and receive them again and thus check the reference clock. On the basis of the delay time of these circulating messages, the various nodes then know which of the time messages from the reference clock are the best ones (for example those time messages from the reference clock which arrive a short time later than a circulating message with a very short circulation time).

This method has the disadvantage that the various nodes have to transmit, receive and evaluate circulating messages repeatedly in order to make it possible to assess which of the time messages from the reference clock are the best ones. These circulating messages on the one hand increase the traffic on the network, since each node to be synchronized generates its own circulating messages. Furthermore, the respective node only ever knows the total delay time of one circulating message—that is to say a message which has been transmitted by it and received again by it—and it therefore cannot state whether the message, for example, was traveling for a particularly long time on the forward path to a specific node or on the return path from this node through the network. To this extent, the synchronization accuracy is also restricted, since only the total delay time of a circulating message is ever available as a selection criterion for synchronization of the local time at the nodes. Finally—particularly when there is a large amount of traffic on the network—it is possible for the total delay time of a circulating message over a lengthy time period not to be sufficiently short and, in consequence, for it to be impossible to synchronize the local time to the reference time at the various nodes, or for such synchronization not to be particularly accurate, in this time period.

Another probabilistic method which is described by way of example in "Probabilistic Clock Synchronization in Distributed Systems" (Arvind, K.), IEEE Trans. Parallel and Distributed Systems, vol. 5, No. 5, pp. 474-487, May 1994, uses only time messages which are transported through the network in one direction, that is to say the only time messages which are transported to the various nodes are those which inform the various nodes of the reference time. No circulating messages are generated by the nodes in this case. This method has the disadvantage that all the time messages which inform the various nodes of the reference time are used by the nodes for synchronization of the local time, irrespective of whether these messages had now been en route for a comparatively long or short time in the network, and not just the best time messages, as in the case of the method described further above. No selection is therefore made of the time messages which are used for synchronization of the local time. On the other hand, this method does not place such a load on the traffic on the network. One advantage of unidirectional transmission of time messages is also that they can be sent as a "broadcast" that is to say only a single message need be sent, which is received by all the receiving nodes.

The local time can be synchronized very accurately at the various nodes by means of the "GPS (Global Positioning System)/Time Service". GPS synchronization is very accurate, but a separate infrastructure is required for synchronization at each node, which is not only technically complex (additional equipment at each node), but is also costly. Furthermore, GPS can be used only to a very restricted extent within large buildings, as well, because the additional technical equipment can frequently in each case be fitted only on the roof, from where the signals must be distributed further within the building.

SUMMARY

In view of this prior art, one object of the invention is to propose a method for synchronization which is simple, and at the same time reliable and of outstanding quality.

This object is achieved by the method according to the invention, as it is characterized by the features of the independent patent claim. Particularly advantageous method variants result from features of the dependent patent claims.

In particular, in the case of the method according to the invention, the local time that is applicable to the particular node is updated at the various nodes in the network, wherein time messages are sent at regular intervals from a node which acts as a higher-level node ("master") to a node which acts as a lower-level node ("slave"). The lower-level node ("slave") receives the time messages which are transmitted from the higher-level node ("master") and evaluates these time messages in order to update its local time. For this purpose, a minimum delay time is defined for a time message between a higher-level node ("master") and a lower-level node ("slave"). On reception of a time message, the lower-level node ("slave") reads the local time of the higher-level node ("master") which is contained in the time message sent from the higher-level node ("master"), and adds the defined minimum delay time to this local time of the higher-level node ("master"). The lower-level node ("slave") thus generates a comparison time (a "map" of the reference), and the comparison time which has been generated in this way is then compared with the node's own local time. In a case in which the comparison time is older than the node's own local time, the node's own local time is not updated while, in contrast, in a case in which the comparison time is newer than the node's own local time, the node's own local time is updated. It can be freely determined in the network which node should act as a higher-level node and which node should act as a lower-level node. This may, for example, be redefined for each particular application. However, time messages are only ever sent from a node which is acting as a higher-level node.

This, on the one hand, makes use of the advantage that time messages need be transmitted in only one direction through the network while, on the other hand, those messages which are used for synchronization are nevertheless selected. Provided that the stability of the local clock at the lower-level node is better than the variation in the delay times of time messages, it is possible on the basis of the comparison of the comparison time with the instantaneous time of the local clock at the lower-level node to select those time messages for updating of the local time which have been traveling for a particularly short time, before they arrive at the lower-level node and are read there.

In one variant of the method according to the invention, the node's own node is updated such that the lower-level node is set to the comparison time. This means that, in the case of those time messages which have been traveling for only a short time in the network, the local time at the lower-level node is updated, to be precise with the time at the lower-level level node in this case being set to the time of the higher-level node plus the minimum delay time (that is to say to the "map" of the reference).

The minimum delay time of a time message between the higher-level node and the lower-level node may either be predetermined, or may be determined by a delay time measurement at the start of the method, or may be determined by a delay time measurement during the method. Nevertheless, there is no need to continuously measure the delay times in the network for good selectivity of the method (if the minimum delay time is predetermined, there is, for example, no need to measure it at all), for which reason the network is also not continuously loaded by such messages.

In a further variant of the method, a dedicated local clock is provided at each node, with the speed of the clock at the lower-level node being slower than the speed of the local clock at the higher-level node. Specifically, if the speed of the local clock at the lower-level node is slower than the speed of the clock at the higher-level node, then, with the normal delay time through the network, this will repeatedly result in the event occurring in which the comparison time is newer than the local time at the lower-level node. However, when this event occurs, the local time at the lower-level node is updated.

When the local time at a lower-level node is updated, then, in the further method variant, in which the speed of the local clock at the lower-level node is adjustable, the speed of the local clock at this lower-level node is set as a function of a number of conditions, specifically as a function of the speed of the local clock before the time at which the local time was updated, as a function of the extent of the update to the local time and, finally and optionally, as a function of the time interval which has passed between two updates of the local time. In this way, the "history" can be taken into account to a reasonable extent in the setting of the speed of the local clock (what the difference speeds of the local clock were before an update, the extent to which the local time was changed when an update was carried out, the time intervals at which updating was carried out). Taking account of the "history" is helpful because it provides information as to how well the speed of the local clock at the lower-level node has been set.

In a further variant of the method according to the invention, monitoring is carried out at the lower-level node for a time interval which can be predetermined and which starts at the time at which the local time in the lower-level node was last updated. In case this time interval is exceeded without the local time at the lower-level node being updated, a virtual local time is produced at the lower-level node, which lags behind the actual local time at the lower-level node (in other words, the virtual local time is in principle representative of a virtual clock which progresses more slowly than the actual local time at the lower-level node). If the comparison time is now newer than the virtual local time produced at the lower-level node, then the local time is updated. In this case, the time interval may also be zero, in other words the virtual local time at the lower-level node may also be produced immediately.

This variant is particularly advantageous when the local time at the lower-level node has not been updated for a lengthy time period (which can be predetermined) and—owing to the fact that updating has not been carried out for a lengthy time period—it is actually questionable how good the local time at the lower-level node is with respect to the local time at the higher-level node (synchronicity). Specifically, the virtual time, which now progresses more slowly, results in a time message once again arriving soon from the higher-level node, from which a comparison time is then generated which is once again newer than the virtual time at the lower-level node. When this event occurs, then the local time at the lower-level node is updated, with the local time at the lower-level node preferably being updated in this case by setting the local time at the lower-level node to the comparison time. Furthermore, this makes it possible for the speed of the local clock at the lower-level node to be made to approximate very well to the speed of the local clock at the higher-level node. During this approximation process, the local clock at the lower-level node may at times run slower or faster than that of the higher-level node. The "slowed-down" virtual time ensures that an update event invariably occurs again.

In the case of a further method variant in which the network has a number of stages, that is to say it comprises two or more sub-networks, via which the individual nodes are connected to one another, individual nodes may act only as higher-level nodes, other nodes may act only as lower-level nodes, and, once again, other nodes may act as higher-level nodes and as lower-level nodes. A node which is acting as a lower-level node is in each case synchronized with respect to its higher-level node via the sub-network between them, but this is decoupled from any synchronization of the higher-level node with respect to its higher-level node. Two advantageous variants of examples of how this decoupling is achieved will be described in the following text.

In a first variant, an independent local clock is provided at a node which acts both as a higher-level node and as a lower-level node. When this node sends a time message to a lower-level node, both the instantaneous value of this independent local clock and the difference between the instantaneous value of this independent local clock and the local time derived from its higher-level node are sent. When such a time message is received at the lower-level node, the comparison time is on the one hand generated from the instantaneous value of the independent local clock contained in the time message. On the other hand, a map of the reference time of the higher-level node is generated from the difference between the instantaneous value of this independent local clock and the local time derived from its higher-level node.

In a second variant, when a time message is sent from a higher-level node to a lower-level node, not only is the sum of all the extents of the updates since the sending of the last time message sent, but also the sum of all the corrections made since the sending of the last message to the speed at which the time passes. On reception of a time message from a higher-level node at the lower-level node, the local time of the lower-level node is first of all changed by the sum of all the extents of updates contained in the time message. Furthermore, the speed at which time passes at the lower-level node, is changed by the sum of all the speed corrections contained in the time message prior to the comparison time being generated at the lower-level node.

Further advantageous variants and aspects will become evident from the following description of the method, with reference to the figures.

DETAILED DESCRIPTION

Figure 1:
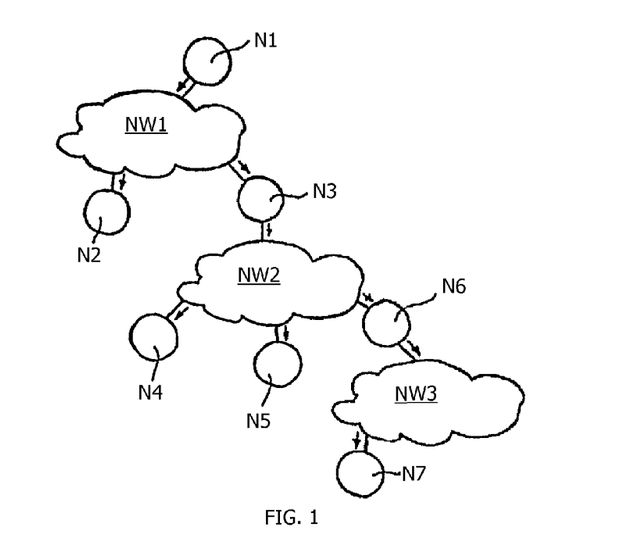
FIG. 1 shows various nodes which are connected to one another by intermediately arranged networks.

FIG. 1 shows a number of nodes N1, N2, N3, N4, N5, N6, N7, which are connected to one another by intermediate (sub-)networks—in this case the networks NW1, NW2 and NW3. The arrows symbolically represent the direction in which time messages are transported from a node via a network to another node.

First of all, only the nodes N1-N3 and the (sub-) network NW1 located in between them will be considered, in a first section. The node N1 in this section under consideration is a higher-level node ("master"), which sends time messages via the network NW1 to the lower-level nodes N2 and N3 ("slave").

Figure 2:
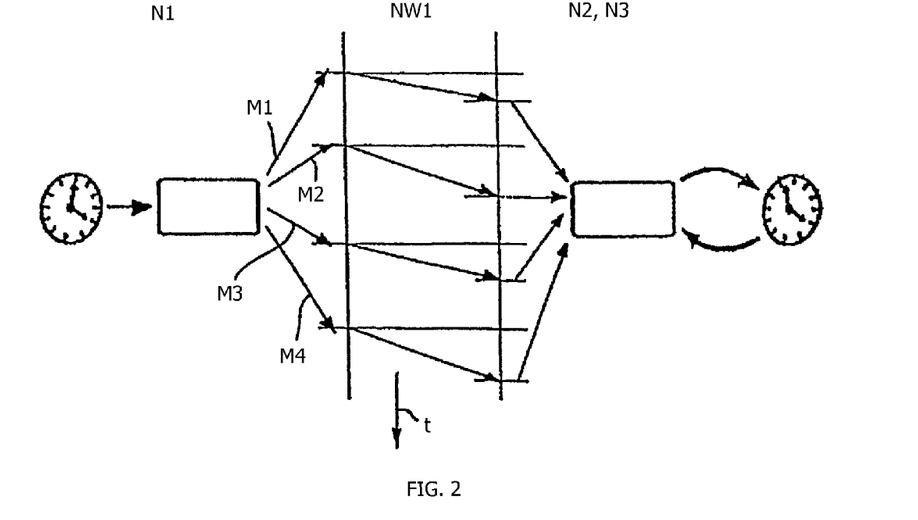
FIG. 2 shows an overview of the procedure for one variant of the method according to the invention, highly simplified.

These time messages each contain the local time at the higher-level node, at that time at which they are sent, as can be seen in the left-hand third of FIG. 2 (in addition, they may also contain a reference to a global reference time, for example UTC or GMT). By way of example, the illustration in FIG. 2 shows that a time message M1-M4 is sent via the network NW1 to the lower-level nodes—N2, N3—from the higher-level node—N1—at each of four successive times. To do this, at each of these times, the higher-level node N1 accesses its local time and transmits this in the respective time message to the lower-level nodes N2 and N3.

While they are being transported via the network NW1, the time messages M1-M4 which are sent from the higher-level node N1 are subject to a time delay (the arrow t indicates the time axis), because the process of transportation via the network NW1 takes a certain amount of time, which may depend on various factors, for example on the density of the traffic on the network NW1. This can be seen in the central third of FIG. 2. A specific minimum delay time $d_{min}$ is assumed for the time which a message requires to pass from the higher-level node N1 via the network NW1 to the lower-level node. This minimum delay time $d_{min}$ can be predetermined and may either be estimated, or may be determined by measurements at the start of the method (which is still to be explained), or else may be determined during the method.

The time messages M1-M4 arrive at the lower-level nodes N2 and N3 at a time which occurs more or less later than the time at which the respective time message was sent. The lower-level node N2 or N3 receives the time messages M1-M4 and reads the local time of the higher-level node N1, which is contained in the respective time message M1-M4. The minimum delay time $d_{min}$ is added to this time that has been read from the respective time message M1-M4 (the minimum delay time $d_{min}$ may have a different value for each node N2, N3), by which means a comparison time is generated. This comparison time is now compared at the lower-level node N2 or N3 with its own local time, as can be seen in the right-hand third of FIG. 2. If the comparison time is older than the local time at the lower-level node (as is the case, by way of example, if the delay times of the time messages M1-M4 through the network NW1 are relatively long), then the local time at the lower-level node N2, N3 is not updated. If, in contrast, the comparison time is more recent than the local time at the lower-level node N2 or N3 (as is the case, for example, when the delay times of the time messages M1-M4 through the network NW1 are short, or if the local time at the lower-level node N2 or N3 progresses correspondingly slower than the local time at the higher-level node N1), the local time at the lower-level node N2 or N3 is updated, to be precise preferably by setting the local time at the lower-level node N2 or N3 to the comparison time.

Figure 3:
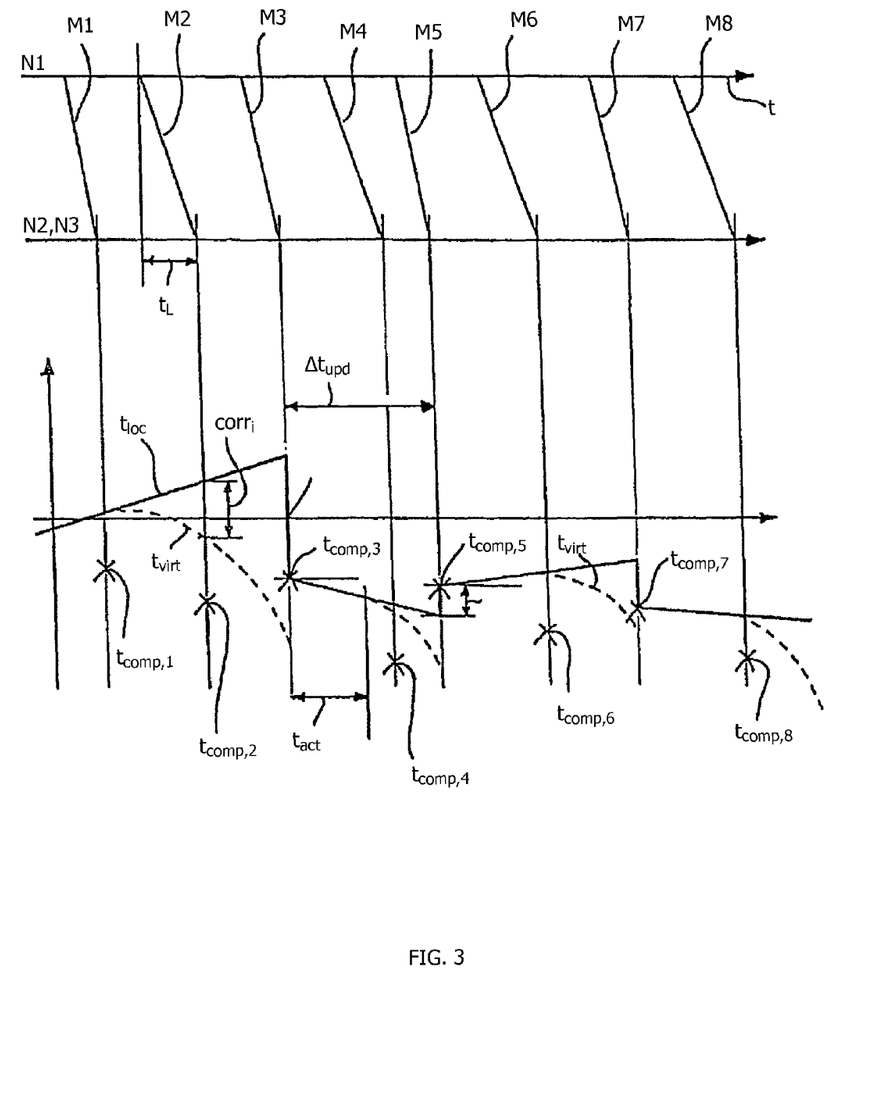
FIG. 3 shows an illustration of the sending of a number of time messages, plotted against the time, at a higher-level node, and the associated reception of these time messages at a lower-level node, as well as the associated profile of the discrepancy between the local time at the lower-level node and the reference time, based on the method variant shown in FIG. 2.

The upper half of the illustration in FIG. 3 shows the sending of a number of time messages plotted against the time at a higher-level node, for example at the node N1, and the associated reception of these time messages at a lower-level node, for example at the nodes N2 and N3. The lower half of FIG. 3 shows the associated profile of the local time at the lower-level node, for example at the nodes N2 and N3.

The upper half of FIG. 3 in this case shows eight different time messages M1-M8, which are sent from the higher-level node N1 and are received at the lower-level nodes N2 and N3 after a delay time $t_L$ (which is normally variable) through the network.

The lower half of the figure shows the profile of the local time $t_{loc}$ at the lower-level node. On receiving the first two messages M1 and M2, the local time of the higher-level node N1 which is contained in the time messages M1 and M2 is first of all read from these messages and, for this purpose, the minimum delay time $d_{min}$ is added to this, thus resulting in the respective comparison time $t_{comp,1}$ and $t_{comp,2}$, which is represented by the corresponding cross in the lower half of FIG. 3. Both comparison times are older than the local time $t_{loc}$ at the lower-level node N2 or N3. The local time $t_{loc}$ at the lower-level nodes N2 and N3 is therefore not updated. If the time $t_{loc}$ (rising ramp) at the lower-level node N2 or N3 were now allowed to continue running at the same speed, then this would result in the local time $t_{loc}$ at the lower-level nodes N2 and N3 never being updated.

In order to make it impossible for a situation such as this to occur, the time interval $t_{act}$ which in each case starts from the time $t_{upd}$ of the last update is monitored. If this time interval $t_{act}$ is now exceeded, without the local time $t_{loc}$ at the lower-level node N2 or N3 having been updated, then, once this period which can be predetermined has elapsed, a virtual local time $t_{virt}$ (dashed line in FIG. 3) is produced at the lower-level node N2 or N3, although this does not represent the local time which is actually passed to an application that is running at the node N2 or N3. Even when a virtual local time $t_{virt}$ such as this is generated at the node N2 or N3, $t_{loc}$ represents the actual local time of the node N2 or N3. The virtual time is obtained by subtracting a correction amount $corr_i$ from the actual local time $t_{loc}$. A correction amount such as this may be calculated, for example, from:

$$Corr_i = t_{loc,i} - t_{upd,j} - t_{act})^\alpha \times c_L,$$

where $t_{loc,i}$ is the local time at the lower-level node N2 or N3 at any given time after the interval $t_{act}$ has elapsed, $t_{upd,j}$ is the time the local time $t_{loc}$ was last updated, $t_{act}$ is the time interval which can be predetermined, and which starts from the time $t_{upd,j}$ when the last update of the local time was carried out, and within which the comparison time determined from the received time messages is compared with $t_{loc}$, with the virtual time $t_{virt}$ starting to run when $t_{act}$ has elapsed without the local time being updated, and then being compared with the comparison time, $\alpha$, $c_L$ are parameters which can be used to influence the extent of the correction amount $corr_i$.

Thus, once the interval $t_{act}$ has elapsed (which may in fact also be zero), if the correction amount $corr_i$ is subtracted from the respective actual current time $t_{loc}$, then this results in the virtual local time which is represented by the respective dashed line in FIG. 3. This virtual local time $t_{virt}$ is now used to compare the comparison times $t_{comp}$ determined from the received time messages.

As soon as the comparison time $t_{comp}$ is now more recent than the virtual local time $t_{virt}$, the local time $t_{loc}$ is updated, to be precise preferably such that the local time $t_{loc}$ at the lower-level node N2 or N3 is set to the comparison time $t_{comp}$, as is the case in FIG. 3, for example for the comparison times $t_{comp,3}$ and $t_{comp,7}$ where the local time $t_{loc}$ at the lower-level node N2 or N3 would not be updated without the comparison with the virtual local time $t_{virt}$. The comparison time $t_{comp,5}$ is not only more recent than the local time $t_{loc}$ but is also more recent than the virtual local time $t_{virt}$, so that, in this case, the local time $t_{loc}$ would be updated just by the comparison with the local time $t_{loc}$ (that is to say without the comparison being carried out with the virtual time $t_{virt}$).

The length of the interval $t_{act}$ is advantageously adapted dynamically taking account of the already mentioned "history" (the extent $C_{upd}$ of the most recent updates, the time interval $\Delta t_{upd}$ between two updates, the speeds after the updates). The interval $t_{act}$ may also, for example, assume the value zero, that is to say the virtual local time $t_{virt}$ in this case starts to run immediately.

As already mentioned further above, it is advantageous, after updating the local time $t_{loc}$ at the lower-level node N2 or N3, for the speed of the local clock to be set, that is to say the speed at which the local time $t_{loc}$ progresses after the updating at the lower-level node, to be precise as a function of the speed of the local clock before the time at which the local time was updated (in FIG. 3, the speed of the local clock corresponds to the gradient of the respective section of the local time $t_{loc}$), and furthermore as a function of the extent $C_{upd}$ of the update, and, finally, as a function of the time interval $\Delta t_{upd}$ which has passed between two updates. In this case, when setting the speed of the local clock, the values of these variables are always considered over a specific previous time period, in order to take reasonable account of the development and thus to improve the "quality" of the synchronization.

A local clock may in this case be formed, for example, by a quartz crystal oscillator, in which case either the quartz crystal itself may be influenced when setting the speed, or a clock which is implemented in software may also be used, in which the speed of the clock can be increased or decreased by software, without having to directly influence the quartz crystal oscillator itself.

The updating of the local time at the lower-level nodes N2, N3 on the basis of the comparison with the comparison time may—as described above—be carried out immediately, and this leads to a sudden change in the local time at the lower-level node N2, N3. Depending on the requirements of a downstream application, it may, however, also be advantageous to extend the required updating of the "local" time that is passed to the application over a specific time interval, so that the "local" time which is passed to the application has a desired profile, for example a continuous profile. This may be achieved, for example, by short-term changes to the running speed of the local oscillator.

The method described above has been explained using the example of only one higher-level node ("master") N1. In principle, two or more mutually synchronized higher-level nodes ("master") may also be provided. This has the advantages that a lower-level node ("slave") can search for the respective best of all the available time messages. Furthermore, this makes it possible to achieve redundancy.

As can be seen from FIG. 1, in the case of a multistage network, the node N3 which is described in the previous description as a lower-level node ("slave") may also be assigned the function of a higher-level node ("master"), specifically as can likewise be seen in FIG. 1, with respect to the nodes N4-N6, which are connected to the node N3 via the (sub)-network NW2. The same applies to the node N6, which on the one hand may be a lower-level node with respect to the node N3, and on the other hand may be a higher-level node ("master") with respect to the node N7, which is connected to the node N6 via the sub-network NW3 located between the nodes N6 and N7.

A node which is acting as a lower-level node, in this case by way of example, one of the nodes N4-N6 may in each case be synchronized with respect to its higher-level node, in this case by way of example with respect to the node N3, via the intermediate sub-network NW2. This synchronization (of the nodes N4-N6) may be decoupled from any synchronization of the higher-level node—in this case the node N3, with respect to its higher-level node, in this case N1. This type of synchronization will be explained in somewhat more detail in the following text.

If the local time (as derived in a node N3 from the time messages received from the node N1) at the node N3 (which—as described above—is in fact occasionally updated) were to be used directly as a reference for synchronization of the nodes N4-N6 using the method described above, then it would not be possible, for example, for the node N4 (only the node N4 is considered in the following text, but the comments apply in the same sense to the nodes N5, N6 as well) to be able to decide whether the difference between its local time (that is to say the local time of the node N4) and the comparison time (which would then in fact be determined directly from the local time of the node N3) were caused by message delay times—in particular delay times between the node N3 and the node N4, or by incorrect synchronization of the local clock at the node N4, or else updates of the local time at the node N3. In fact, updating of the local time of the node N3 may in this case result in additional uncertainty. Since the overall synchronization error of the node N4 with respect to the "reference" node N1 may be greater than the sum of the individual errors resulting in the two network (elements) NW-1 and NW2, these should be considered independently of one another.

In order to ensure decoupling of the synchronization of the node N4 with respect to its higher-level node N3 from the synchronization of this node N3 with respect to its higher-level node N1, it is possible, for example, to provide an independent local clock at the node N3. This independent local clock at the node N3 may (according to the method already described further above) be used for synchronization of the node N4, so that the synchronization via the sub-network NW2 is not influenced by the synchronization via the sub-network NW1. In this case, the independent local clock of the node N3 is regarded as that local time at which the delay time $d_{min}$ which is specific for the sub-network NW2 (see further above) is added in order to generate the comparison time at the node N4.

The node N4 thus first of all receives a "map" of the independent local clock of the node N3. In order furthermore to receive a map of the "reference time" of the node N1 as well, the time messages which are sent from the node N3 contain not only the instantaneous values of the independent local clock of the node N3 but also the instantaneous difference between these instantaneous values of the independent local clock at the node N3 and the respective local time (derived from the time messages from the node N1) at the node N3 (including any updates). On the basis of this information, specifically on the one hand the information about the instantaneous values of the independent local clock of the node N3 and on the other hand the information about the difference between the instantaneous values of the independent local clock at the node N3 and the respective local time (derived from the time messages from the node N1) at the node N3, the node N4 is then able to define a "map" of the "reference time" at the node N1.

In further synchronization stages—for example of the node N6 via the network element NW3 to the node N7—this method can be used such that the time messages which are sent from the node N6 in fact contain the instantaneous values of an independent local clock at the node N6 and the respective difference between these instantaneous values of the independent local clock at the node N6 and the map of the "reference time" of the node N1.

One advantageous variant of the decoupling of the various stages for synchronization will be explained in the following text, which does not require the additional independent local clocks that have just been described. However, these variants require time messages which contain the following three information items:

1) as previously, the current local time at the sending node at the time when the time message is sent, 2) in addition, the sum of all the extents of updates (that is to say $\Sigma C_{upd}$) of the local time at this (sending) node since this node sent the most recent time message, 3) the sum of all the adaptations to the speed of the local clock since the sending of the most recent time message from this (sending) node.

Since the local time of the node N1 in this case represents the absolute reference and no changes are made to this time (neither is the time itself updated nor is the speed at which this time progresses), the two last-mentioned components 2) and 3) in the time messages which are sent from the node N1 to the nodes N2 and N3 are always zero.

The synchronization method which has been described in detail further above with reference to FIGS. 2 and 3 will now therefore be modified as follows.

When a time message is received at a lower-level node ("slave"), the corrections to the local clock of the sender ("master") of the time message are first of all carried out directly, and are locally buffer-stored. This means that, for example, no corrections to the local clock of the sender may be carried out at the node N3, because the sender is in fact the node N1 and the time of the node N1 and the speed at which the time progresses at the node N1 are not changed. In contrast, for example at the node N6 ("slave"), the instantaneous value of the local time at the node N6 is changed by $\Sigma C_{upd}$ of the sending node N3 ("master")—that is to say by the sum of the extents of the updates at the node N3 since the sending of the most recent time message from the node N3. Furthermore, the speed with which the local time progresses at the node N6 ("slave") is changed by the sum of all the corrections to the speed at the sending node N3 ("master") since the most recent time message was sent from the node N3.

The method, as has also been explained above with reference to FIG. 2 and FIG. 3, is applied to the local time that is obtained in this way at the node N6. In this case, the comparison time at the node N6 is the local time (contained in the time message from the node N3) at the node N3 ("master") plus the minimum delay time $d_{min}$ that is specific for the sub-network NW2.

Furthermore, the adaptations that have been carried out both to the local time at the node N6 as well as the change to the speed are taken into account in the local variables. The next time message from the node N6—in its function as a higher-level node ("master")—to the node N7 via the network element N3 then contains, as the reference time, the corresponding current local time at the node N6 at the time at which the time message was sent, as well as the current values for the sum of all the extents of updates $\Sigma C_{upd}$ carried out at the node N6 and for the sum of all the adaptations to the speed of the time at the node N6. Once a time message such as this has been sent, these values are reset to zero again, because, in fact, they have then already been taken into account by the receiving node—in this case N7—as a result of the process described above.

The invention claimed is:

1. A method for synchronization in a network having a plurality of nodes, the plurality of nodes comprising higher-level nodes and lower-level nodes and the plurality of nodes including a first lower-level node, the method comprising:

the first node regularly receiving time messages transmitted from one or more higher-level nodes of the plurality of nodes, including receiving a time message from a higher-level node, wherein the time message comprises a local time of the higher-level node, and wherein a minimum delay time is defined for time messages between higher-level nodes and lower-level nodes;

the first lower-level node evaluating the time message received from the higher-level node, wherein said evaluating comprises:

on reception of the time message, reading the local time of the higher-level node, and adding the defined minimum delay time to the local time of the higher-level node, thereby generating a comparison time;

comparing the comparison time with the first lower-level node's local time;

if the comparison time is newer than the first lower-level node's local time, updating the first lower-level node's local time in accordance with the comparison time and if the comparison time is older than the first lower-level node's local time, the first lower-level node's local time is not updated;

monitoring the time since the last update of the local time of the first lower-level node;

comparing the time since the last update of the local time of the first lower-level node with a time interval, which can be predetermined;

if the time since the last update of the local time of the first lower-level node exceeds the time interval, producing a virtual local time at the first lower-level node wherein the virtual local time lags behind the actual local time at the first lower-level node;

if the comparison time is newer than the virtual local time which has been produced at the first lower-level node; updating the first lower-level node's local time in accordance with the comparison time.

2. The method of claim 1, wherein the time messages received by the first lower-level node are first time messages, the method further comprising:

the first lower-level node regularly sending second time messages to one or more lower-level nodes of the plurality of nodes, including sending a third time message to a lower-level node, wherein the third time message comprises a local time of the first lower-level node;

wherein the third time message is useable by the lower-level nodes to update the lower-level node's local time by:

the lower-level node evaluating the time message received from the first lower-level node, comprising:

on reception of the third time message, reading the local time of the first lower-level node, and adding the defined minimum delay time to the local time of the first lower-level node, thereby generating another comparison time;

comparing the other comparison time with the lower-level node's local time;

if the other comparison time is newer than the lower-level node's local time, updating the lower-level node's local time in accordance with the other comparison time;

wherein, if the other comparison time is older than the lower-level node's local time, the lower-level node's local time is not updated.

3. The method of claim 2, further comprising:

determining which nodes of the plurality of nodes act as upper-level nodes, and which nodes act as lower-level nodes, wherein only nodes acting as higher-level nodes send time messages.

4. The method of claim 1, wherein said updating the lower-level node's local time in accordance with the other comparison time comprises setting the lower-level node's local time to the comparison time.

5. The method of claim 1, wherein the minimum delay time is:

predetermined;

determined by a delay time measurement performed at the start of the method; or determined by a delay time measurement performed during the method.

6. The method of claim 1, wherein each node of the plurality of nodes comprises a respective local clock, wherein the speed of the respective local clock at lower-level nodes is slower than the speed of the respective local clock at higher-level nodes.

7. The method of claim 6, wherein the speed of the respective local clocks at the lower-level nodes can be adjusted, and in which, after each update of the local time at a respective lower-level node, the speed of the local clock at the respective lower-level node is adjusted to be precise as a function of the speed of the local clock before the time of the update of the local time, and as a function of the time interval of the update to the local time.

8. The method of claim 7, wherein the speed of the local clock at the respective lower-level node is adjusted to be precise further as a function of a time interval which has passed between two updates of the local time for the respective lower-level node.

9. The method of claim 1, wherein the network has a number of stages, comprising two or more sub-networks via which individual nodes are connected to one another, wherein each node in a first subset of the plurality of nodes can act only as higher-level nodes, wherein a second subset of the plurality of nodes can act only as lower-level nodes, and wherein a third subset of the plurality of nodes can act both as higher-level nodes and as lower-level nodes; and wherein synchronization of a node acting as a lower-level node is carried out with respect to its higher-level node via at least one of the two or more sub-networks, but is decoupled from any synchronization of the higher-level node with respect to the higher-level node's higher-level node.

10. The method according to claim 9, wherein an independent local clock is provided at a second node which acts both as a higher-level node and as a lower-level node, wherein when a time message is sent from the second node to a lower-level node, both an instantaneous value of the independent local clock and a difference between the instantaneous value of the independent local clock and the local time derived from its higher-level node are sent, and wherein on reception of such a time message, the comparison time is generated from the instantaneous value of the independent local clock contained in the time message and wherein a map of the reference time of the higher-level node is derived from the difference between the instantaneous value of the independent local clock and the local time derived from its higher-level node at the lower-level node.

11. The method according to claim 9, wherein, when a time message is sent from a higher-level node to a lower-level node, not only is the sum of all the extents of updates performed since the last time message sent, but also the sum of all the corrections made since the last time message sent to the speed at which the time passes, and wherein, on reception of a time message from a higher-level node at the lower-level node, the local time of the lower-level node is first changed by the sum of all the extents of updates contained in the time message, and furthermore, the speed at which time passes at the lower-level node is changed by the sum of all the speed corrections contained in the time message prior to the comparison time being generated at the lower-level node.

\* \* \* \* \*